(12) United States Patent
Shingu

(10) Patent No.: US 9,909,795 B2
(45) Date of Patent: Mar. 6, 2018

(54) VEHICULAR AIR CONDITIONER

(71) Applicant: Wahei Shingu, Chiyoda (JP)

(72) Inventor: Wahei Shingu, Chiyoda (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 280 days.

(21) Appl. No.: 14/435,658

(22) PCT Filed: Feb. 27, 2013

(86) PCT No.: PCT/JP2013/055073
§ 371 (c)(1),
(2) Date: Apr. 14, 2015

(87) PCT Pub. No.: WO2014/132352
PCT Pub. Date: Sep. 4, 2014

(65) Prior Publication Data
US 2016/0010909 A1    Jan. 14, 2016

(51) Int. Cl.
*F25B 49/02* (2006.01)
*F25B 13/00* (2006.01)
(Continued)

(52) U.S. Cl.
CPC ....... *F25B 49/022* (2013.01); *B60H 1/00485* (2013.01); *B60H 1/00907* (2013.01);
(Continued)

(58) Field of Classification Search
CPC .............. F25B 13/00; F25B 49/022; F25B 2313/0292; F25B 2500/27; F16K 11/0655;
(Continued)

(56) References Cited

U.S. PATENT DOCUMENTS 4,586,351 A * 5/1986 Igarashi ................. F25B 41/04
62/468
4,644,760 A * 2/1987 Aoki ..................... F25B 41/046
137/625.43
(Continued)

FOREIGN PATENT DOCUMENTS

JP          5-264113 A      10/1983
JP          59-080576 A      5/1984
(Continued)

OTHER PUBLICATIONS

International Search Report (PCT/ISA/210) dated Apr. 23, 2013, by the Japanese Patent Office as the International Searching Authority for International Application No. PCT/JP2013/055073.
(Continued)

*Primary Examiner* — Frantz Jules
*Assistant Examiner* — Lionel Nouketcha
(74) *Attorney, Agent, or Firm* — Buchanan Ingersoll & Rooney PC

(57) ABSTRACT

In a vehicular air conditioner in which a cooling operation and a heating operation are switched by switching a four-way valve, a pressure accumulator is provided in which a coolant, which is related to an aspiration pressure of a compressor, is accumulated when the compressor is operated, and a differential pressure, which is required for switching the four-way valve, between piston rooms is maintained, and the differential pressure, which is required for switching the four-way valve, is generated between the piston rooms of the four-way valve even after the compressor is stopped.

4 Claims, 4 Drawing Sheets

(51) Int. Cl.
*F16K 11/065* (2006.01)
*B60H 1/00* (2006.01)
(52) U.S. Cl.
CPC .......... *F16K 11/0655* (2013.01); *F25B 13/00* (2013.01); *B60H 2001/00935* (2013.01); *F25B 2313/0292* (2013.01); *F25B 2500/27* (2013.01)
(58) Field of Classification Search
CPC ........ F16K 31/40; F16K 31/42; F16K 31/423; B60H 1/00907; B60H 1/00485; B60H 2001/00935; F15B 13/043
USPC .................................. 137/625.43; 251/30.01
See application file for complete search history.

(56) References Cited

U.S. PATENT DOCUMENTS

| | | | | |
|---|---|---|---|---|
| 6,481,243 | B1 * | 11/2002 | Fang | F25B 40/00 62/498 |
| 2012/0073311 | A1 * | 3/2012 | Jeong | F25B 45/00 62/56 |

FOREIGN PATENT DOCUMENTS

| | | | |
|---|---|---|---|
| JP | 61-59160 A | | 3/1986 |
| JP | 61-153355 A | | 7/1986 |
| JP | 61-218883 A | | 9/1986 |
| JP | 62-088882 A | | 4/1987 |
| JP | 05264113 A | * | 10/1993 |
| JP | 11-063738 A | | 3/1999 |
| JP | 11063738 A | * | 3/1999 |
| JP | 2009-024945 A | | 2/2009 |

OTHER PUBLICATIONS

Office Action (Reason) dated Sep. 8, 2015, by the Japanese Patent Office in corresponding Japanese Patent Application No. 2015-502619, and an English Translation of the Office Action. (5 pages).

Extended European Search Report dated Feb. 6, 2017, issued by the European Patent Office in corresponding European Application No. 13876230.7. (6 pages).

* cited by examiner

VEHICULAR AIR CONDITIONER

TECHNICAL FIELD

The present invention relates to a vehicular air conditioner in which a cooling operation and a heating operation are switched by a four-way valve.

BACKGROUND ART

When a cooling operation and a heating operation are switched in an air conditioner, a coolant flow is switched by using a four-way valve. In general, a switching method of the four-way valve is applied with respect to one side piston room and the other side piston room at both-end portions of the four-way valve, and a high-pressure coolant is supplied to the one side piston room via a control solenoid valve, and the coolant is aspirated from the other side piston room via the control solenoid valve so as to decrease a pressure of the coolant, and a valve unit is operated in accordance with a generated differential pressure (a detail explanation is described later).

A conventional vehicular air conditioner is disclosed in Patent Document 1. The conventional vehicular air conditioner is related to a switching method of a four-way valve, and when a switching command of a cooling operation and a heating operation is received while a compressor is stopped, the vehicular air conditioner is controlled in such a way that the four-way valve is switched after a thermostat is turned on, and an inverter frequency exceeds a predetermined value. Moreover, when the switching command of the cooling operation and the heating operation is received while the compressor is operated, the vehicular air conditioner is controlled in such a way that the thermostat is turned off after the four-way valve is switched. Thereby, it is eliminated that a differential pressure, which is required for a switching operation of the four-way valve, is not sufficiently generated.

CONVENTIONAL ART DOCUMENT

Patent Document

Patent Document 1: Japanese Laid-Open Patent Publication No. H05-264113

SUMMARY OF THE INVENTION

Problems to be Solved by the Invention

In a conventional vehicular air conditioner, a differential pressure is required between the piston rooms at both end portions in order to switch a four-way valve, so that the four-way valve is switched only when a compressor is operated. However, in the vehicular air conditioner which is mounted in an electric train, a power source is dependent on the vehicle side, so that there has been a problem in that the compressor is stopped in accordance with a disconnection method of the vehicular power source before the four-way valve is switched, and a discharge pressure is equivalent to an aspiration pressure in the compressor, and a valve unit inside the four-way valve is stopped at a middle position (the four-way valve is insufficiently switched).

The present invention has been made to solve above-described problems, and an object of the invention is to provide a vehicular air conditioner in which a differential pressure, which is required for switching a four-way valve, between piston rooms can be maintained even after a compressor is stopped, and it can be prevented that a valve unit inside the four-way valve is stopped at a middle position.

Means for Solving Problems

A vehicular air conditioner of the present invention includes a four-way valve which includes a piston mechanism in which a valve unit is shifted between one side piston room and the other side piston room, in a state where a discharge pressure of a compressor is acted to the one side piston room of the four-way valve, and an aspiration pressure of the compressor is acted to the other side piston room of the four-way valve, and the piston mechanism and the valve unit are shifted by using a differential pressure between the piston rooms, and the four-way valve is switched, whereby a cooling operation and a heating operation are switched; wherein a pressure accumulator is provided in which a coolant, which is related to the aspiration pressure of the compressor, is accumulated when the compressor is operated, and the differential pressure, which is required for switching the four-way valve, between the piston rooms is maintained, and the differential pressure, which is required for switching the four-way valve, is generated between the piston rooms of the four-way valve even after the compressor is stopped, and the pressure accumulator is a low pressure accumulator of a coolant which is aspirated to the compressor, and the low pressure accumulator is connected to a pipe, which passes the low pressure coolant which is aspirated to the compressor, via a check valve in which a flow direction is a direction for aspirating the coolant to the compressor, and the low pressure accumulator is connected to the one side or the other side piston room via a control solenoid valve, whereby the coolant is aspirated from the one side or the other side piston room.

Effects of the Invention

According to a vehicular air conditioner of the present invention, a pressure accumulator is provided in which a coolant, which is related to an aspiration pressure of a compressor, is accumulated when the compressor is operated, and a differential pressure, which is required for switching a four-way valve, between piston rooms is maintained, so that the differential pressure, which is required for switching the four-way valve, between the piston rooms can be maintained even after the compressor is stopped, and it can be prevented that a valve unit inside the four-way valve is stopped at a middle position.

An aim, a characteristic, a viewpoint, and an effect of the present invention, which are not described in the above explanations, will be cleared by the following detail explanations for the present invention in reference to drawings.

MODE FOR CARRYING OUT THE INVENTION

Embodiment 1

Figure 1:
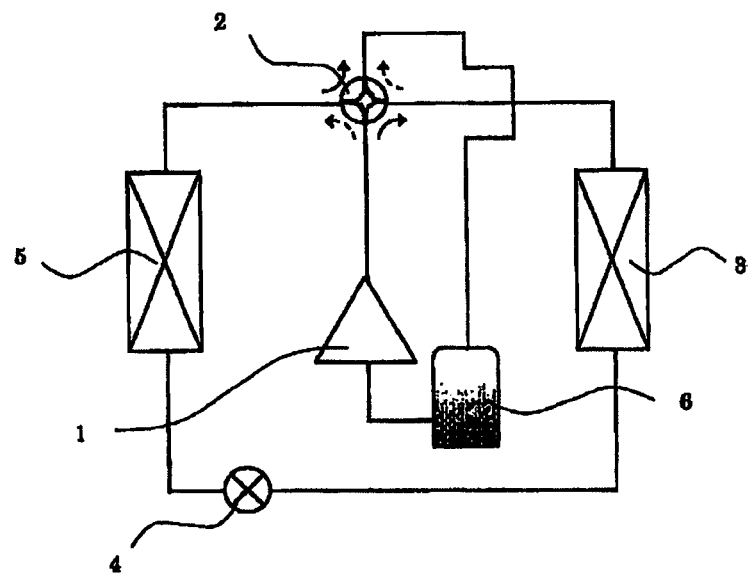
FIG. 1 is a view illustrating a coolant circulation cycle of a general heat pump type in a vehicular air conditioner.

FIG. 1 is a view illustrating a coolant circulation cycle of a general heat pump type in a vehicular air conditioner. Main components in the vehicular air conditioner, in which a cooling operation and a heating operation can be switched, are composed of a compressor, an indoor heat exchanger, an outdoor heat exchanger, an expansion valve, an accumulator, and a four-way valve (a four-passage switching valve for switching a cycle). When the cooling operation and the heating operation are switched, a flow direction of a coolant in the coolant circulation cycle is switched by using the four-way valve. In FIG. 1, a solid line indicates a flow direction of the coolant when the cooling operation is performed, and a dashed line indicates a flow direction of the coolant when the heating operation is performed.

When the cooling operation is performed, the coolant, which is compressed by a compressor 1 so as to be changed to the high-temperature and high-pressure coolant, passes through a four-way valve 2 and reaches to an outdoor heat exchanger 3, and heat is exchanged between the coolant and the outside air, and the heat of the coolant is removed so as to cool the coolant, whereby the coolant is condensed so as to be changed to a medium-temperature and high-pressure liquid. The coolant, which is condensed, is expanded by an expansion valve 4 so as to be evaporated. The heat is exchanged between the coolant, which is evaporated so as to be changed to the low-temperature and low-pressure coolant, and an inside air by an indoor heat exchanger 5, and the inside air is cooled by removing the heat, and the coolant is passed through the four-way valve 2 and returned to the compressor 1 via an accumulator 6. The above-described cycle is repeated.

On the other hand, when the heating operation is performed, the coolant, which is compressed by the compressor 1 so as to be changed to the high-temperature and high-pressure coolant, passes through the four-way valve 2 and reaches to the indoor heat exchanger 5, and heat is exchanged between the coolant and the inside air, and the heat of the coolant is removed so as to heat the inside air, and the coolant is decompressed by the expansion valve 4. The heat is exchanged between the coolant, which is decompressed so as to be changed to the low-temperature and low-pressure coolant, and an outside air by the outdoor heat exchanger 3, and the heat is removed from the outside air, and the coolant is passed through the four-way valve 2 and returned to the compressor 1 via the accumulator 6. The above-described cycle is repeated.

Figure 2:
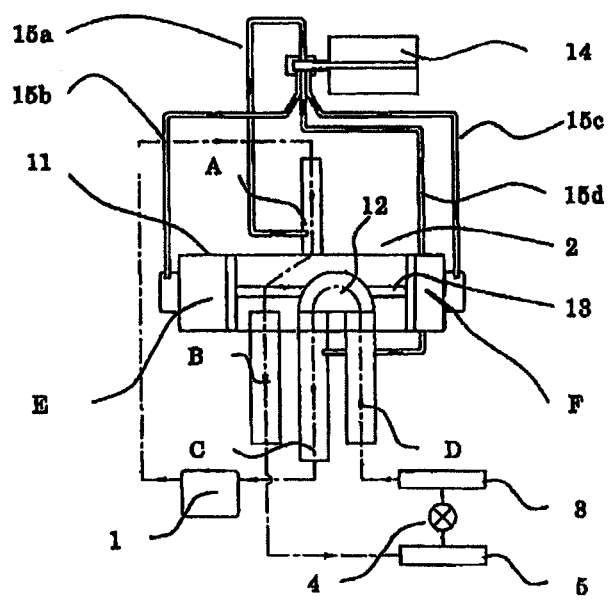
FIG. 2 is a view illustrating a state of a four-way valve when a heating operation is performed in a general coolant circulation cycle in a vehicular air conditioner.

FIG. 2 is a view illustrating a state of a four-way valve when a heating operation is performed in a general coolant circulation cycle in a vehicular air conditioner. In addition, the accumulator 6 is not illustrated in FIG. 2. The four-way valve 2 includes a cylindrical valve main unit 11 in which both end portions are closed, a valve unit 12 which is slid and shifted in the valve main unit 11 so as to switch a flow passage of the coolant, a piston mechanism 13 for operating the valve unit 12, and a control solenoid valve 14 for switching a pressure by which the piston mechanism 13 is driven. The valve main unit 11 and the piston mechanism 13 are linked, whereby a piston room E is configured at a left end portion of the valve main unit 11 in FIG. 2, and a piston room F is configured at a right end portion of the valve main unit 11 in FIG. 2. The four-way valve 2 further includes an inlet connector (pipe) A, an outlet connector (pipe) C, a switch connector (pipe) B, and a switch connector (pipe) D. The piston mechanism 13 for shifting the valve unit 12 is provided between the piston room E and the piston room F.

A high-pressure coolant, which is compressed by the compressor 1, is supplied to the inlet connector A, and a low-pressure coolant, which is outputted from the outlet connector C, is aspirated to the compressor 1. In a method of switching the four-way valve 2, the piston mechanism 13 and the valve unit 12 are slid and shifted in accordance with a differential pressure (a pressure difference) which is generated between the piston room E and the piston room F at both-end portions of the four-way valve 2. When a heating operation is performed, a high-pressure coolant (a coolant which is related to a discharge pressure of the compressor 1), which is outputted from the inlet connector A, is passed through a capillary tube (hereinafter, referred to as a tube) 15a, and the coolant is passed through a tube 15b via the control solenoid valve 14 so as to be supplied to the piston room E, whereby a pressure in the piston room E is increased. A coolant, which is outputted from the piston room F, is passed through a tube 15c, and the coolant is passed through a tube 15d via the control solenoid valve 14 so as to be aspirated from the outlet connector C, whereby a pressure in the piston room F is decreased, and an aspiration pressure of the compressor 1 is acted. As a result, the piston mechanism 13 and the valve unit 12 are slid and shifted toward a right side in FIG. 2 in accordance with the differential pressure between the piston room E and the piston room F, and the inlet connector A is linked to the switch connector B, and the switch connector D is linked to the outlet connector C.

On the other hand, when a cooling operation is performed, the high-pressure coolant, which is outputted from the inlet connector A, is passed through the tube 15a, and a flow direction of the coolant is switched by the control solenoid valve 14, and the high-pressure coolant is passed through the tube 15c so as to be supplied to the piston room F, whereby a pressure in the piston room F is increased. A coolant, which is outputted from the piston room E, is passed through the tube 15b, and a flow direction of the coolant is switched by the control solenoid valve 14, and the coolant is passed through the tube 15d so as to be aspirated from the outlet connector C, whereby a pressure in the piston room E is decreased, and an aspiration pressure of the compressor 1 is acted. As a result, the piston mechanism 13 and the valve unit 12 are slid and shifted toward a left side in FIG. 2 in accordance with the differential pressure between the piston room E and the piston room F, and the inlet connector A is linked to the switch connector D, and the switch connector B is linked to the outlet connector C.

As described above, the differential pressure is required between the piston room E and the piston room F in order to switch the four-way valve 2, so that the four-way valve 2 is switched only when the compressor 1 is operated. However, in the vehicular air conditioner which is mounted in an electric train, a power source is dependent on the vehicle side, so that the compressor 1 is stopped in accordance with a disconnection method of the vehicular power source before the four-way valve 2 is switched, and a discharge pressure is equivalent to an aspiration pressure in the compressor 1, and it is caused that the valve unit 12 is stopped at a middle position inside of the four-way valve 2.

Figure 3:
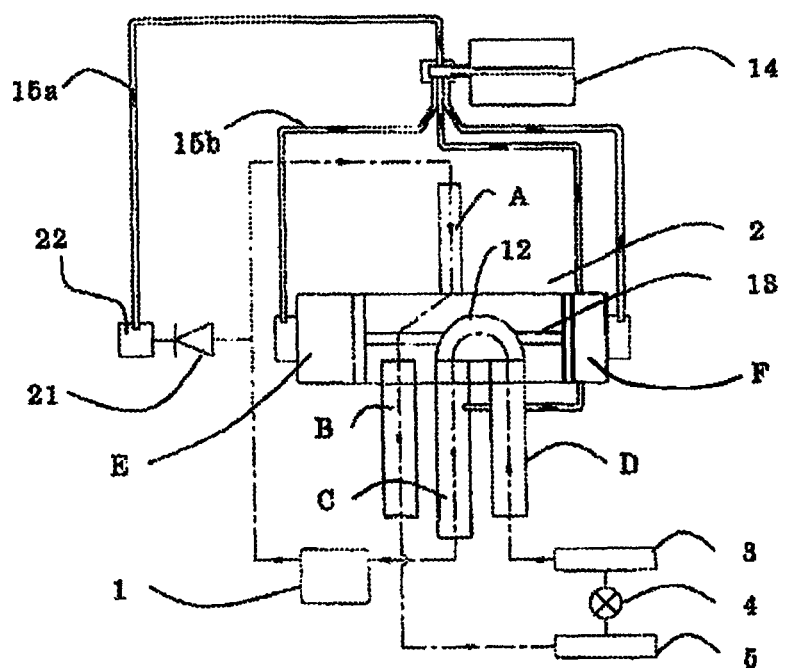
FIG. 3 is a view illustrating a coolant circulation cycle in a vehicular air conditioner according to Embodiment 1 of the present invention.

FIG. 3 is a view illustrating a coolant circulation cycle in a vehicular air conditioner according to Embodiment 1 of the present invention. The four-way valve 2 indicates a condition in which a heating operation is performed. A high pressure accumulator 22 is connected to a pipe (a pipe for connecting the compressor 1 to the inlet connector A), in which a high pressure coolant discharged from the compressor 1 is flowed, via a check valve 21 which is connected to the pipe. The pressure accumulator 22 is linked to the piston room E via the tube 15a, the control solenoid valve 14, and the tube 15b, and the high pressure coolant is supplied to the piston room E so as to increase a pressure in the piston room E. In the check valve 21, a direction from the pipe, in which the high pressure coolant is flowed, to the high pressure accumulator 22 is a flow direction. In the vehicular air conditioner which is configured as described above, the high pressure accumulator 22 is provided via the check valve 21 which is connected to the high pressure coolant pipe, and a coolant, which is related to the discharge pressure of the compressor 1, is accumulated in the accumulator 22 when the compressor 1 is operated, and the differential pressure is generated between the piston room E and the piston room F, so that the high pressure coolant exists in the high pressure accumulator 22 even after the compressor 1 is stopped, whereby the high pressure coolant can be aspirated to the piston room E or the piston room F in the four-way valve 2, and the differential pressure, which is required when the four-way valve 2 is switched, between the piston room E and the piston room F can be maintained. Therefore, it can be prevented by the above-described configuration that the four-way valve 2 is stopped at a middle position, and a safety cooling or heating operation can be performed.

In addition, although the control solenoid valve 14 is disconnected from a power source when the compressor 1 is disconnected from the power source, the control solenoid valve 14 is stopped at a heating switch position or a cooling switch position between the tube 15a and the tube 15d, so that the four-way valve 2 can be stopped at a heating switch position or a cooling switch position between the connector A and the connector D in accordance with the pressure supplied by the pressure accumulator 22, and a middle position stop of the valve unit 12 of the four-way valve 2 can be reliably prevented. In addition, the middle position stop of the valve unit 12 represents a halfway switching condition in a state where the outlet connector C is not linked to the switch connector D or the switch connector B, and the outlet connector C is linked to a part of the switch connector D and a part of the switch connector B.

Embodiment 2

Figure 4:
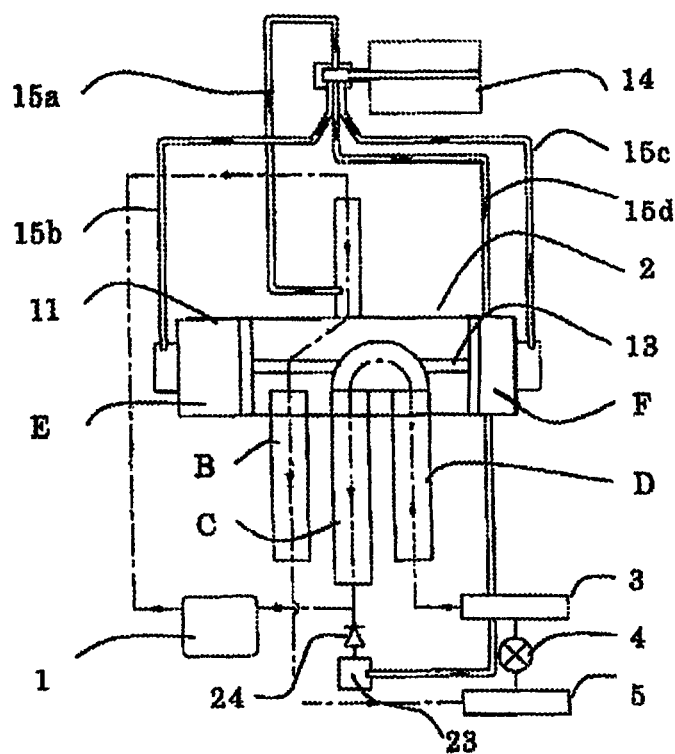
FIG. 4 is a view illustrating a coolant circulation cycle in a vehicular air conditioner according to Embodiment 2 of the present invention.

FIG. 4 is a view illustrating a coolant circulation cycle in a vehicular air conditioner according to Embodiment 2 of the present invention. A four-way valve 2 indicates a condition in which a heating operation is performed. In Embodiment 2, a low pressure accumulator 23, which is connected to a low pressure pipe, is provided instead of the high pressure accumulator 22 in Embodiment 1. The low pressure accumulator 23 is connected a pipe (a pipe for connecting an outlet connector C to a compressor 1), in which a low pressure coolant is flowed, via a check valve 24. In the check valve 24, a direction from the pressure accumulator 23 to the low pressure pipe is a flow direction. In FIG. 4, the low pressure accumulator 23 is linked to a piston room F via a tube 15d, a control solenoid valve 14, and a tube 15c. The coolant in the piston room F is passed through the tube 15c, and passed through the tube 15d via the control solenoid valve 14, and passed through the accumulator 23, and the coolant reaches to the low pressure pipe via the check valve 24, and the coolant is aspirated by the compressor 1. Thereby, a pressure in the piston room F is decreased.

In the vehicular air conditioner which is configured as described above, the low pressure accumulator 23 is provided via the check valve 24 which is connected to the pipe for flowing the low pressure coolant, and a coolant, which is related the discharge pressure of the compressor 1, is accumulated in the accumulator 23 when the compressor 1 is operated, and the differential pressure is generated between the piston room E and the piston room F, so that the pressure in the piston room E or the piston room F in the four-way valve 2 is decreased in accordance with the low pressure in the accumulator 23 even after the compressor 1 is stopped, whereby the differential pressure, which is required when the four-way valve 2 is switched, between the piston room E and the piston room F can be maintained. Therefore, it can be prevented by the above-described configuration that the four-way valve 2 is stopped at a middle position, and a safety cooling or heating operation can be performed.

Embodiment 3

In Embodiment 3, a capacity of the pressure accumulator 22 and the pressure accumulator 23, which are provided in the vehicular air conditioners according to Embodiment 1 and Embodiment 2, is 1.5 times to 3 times with respect to a maximum capacity of the piston room E or the piston room F of the four-way valve 2. Thereby, a discharge pressure coolant or an aspiration pressure coolant, of which capacity is larger than the maximum capacity of the piston room E or the piston room F of the four-way valve 2, can be accumulated, and a sufficient differential pressure can be maintained between the piston rooms of the four-way valve 2 when the four-way valve 2 is switched, whereby the four-way valve 2 can be reliably switched. When the capacity of the pressure accumulator exceeds 3 times with respect to the maximum capacity of the piston room, it is not desirable that a volume of the vehicular air conditioner is increased.

Embodiment 4

Figure 5:
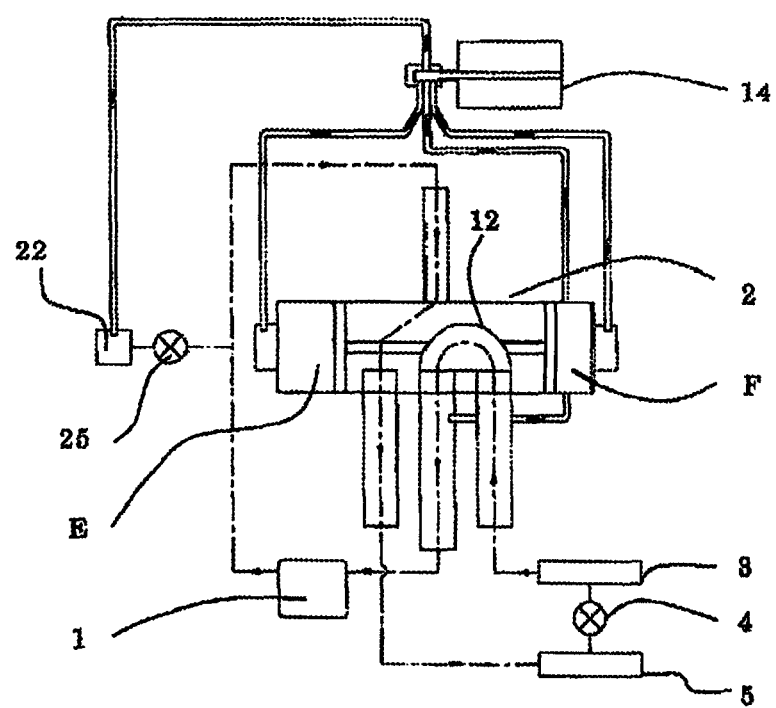
FIG. 5 is a view illustrating a coolant circulation cycle in a vehicular air conditioner according to Embodiment 4 of the present invention.

In Embodiment 4, a solenoid valve 25 is provided instead of the check valves which are provided in the vehicular air conditioners according to Embodiment 1 and Embodiment 2. FIG. 5 is a view illustrating a coolant circulation cycle in a vehicular air conditioner according to Embodiment 4 of the present invention. A four-way valve 2 indicates a condition in which a heating operation is performed. The solenoid valve 25 interrupts a coolant flow when the solenoid valve 25 is disconnected from a power source, and the solenoid valve 25 passes the coolant flow when the solenoid valve 25 is connected to the power source. The vehicular air conditioner according to Embodiment 4 is configured as described above, so that a similar effect, which is obtained in the vehicular air conditioners according to Embodiment 1 and Embodiment 2, can be obtained.

In addition, in the scope of the present invention, it is possible that each of embodiments is freely combined, or each of embodiments is suitably modified or omitted.

What is claimed is:
1. A vehicular air conditioner, comprising:
   a four-way valve including:
   a piston mechanism;
   a valve unit configured to be shifted between one side piston room and an another side piston room, in a state where a discharge pressure of a compressor is acted to the one side piston room of the four-way valve, and an aspiration pressure of the compressor is acted to the another side piston room of the four-way valve, and the piston mechanism and the valve unit are shifted by using a differential pressure between the piston rooms, and the four-way valve is switched, whereby a cooling operation and a heating operation are switched;

a pressure accumulator in which a coolant which is related to the aspiration pressure of the compressor is accumulated when the compressor is operated; and the differential pressure which is required for switching the four-way valve between the piston rooms is maintained in the pressure accumulator;

the differential pressure which is required for switching the four-way valve is generated between the piston rooms of the four-way valve when the compressor is stopped and is not being operated;

the pressure accumulator is a low pressure accumulator of a coolant which is aspirated to the compressor;

the low pressure accumulator is connected to a pipe which passes the low pressure coolant which is aspirated to the compressor via a check valve in which a flow direction is a direction for aspirating the coolant to the compressor; and the low pressure accumulator is connected to the one side or the another side piston room via a control solenoid valve; whereby the coolant is aspirated from the one side or the another side piston room.

2. A vehicular air conditioner as recited in claim 1, wherein a capacity of the pressure accumulator is 1.5 times to 3 times with respect to a maximum capacity of the one side or the another side piston room.

3. A vehicular air conditioner, comprising:
a four-way valve including:
a piston mechanism;
a valve unit configured to be shifted between one side piston room and an another side piston room, in a state where a discharge pressure of a compressor is acted to the one side piston room of the four-way valve, and an aspiration pressure of the compressor is acted to the another side piston room of the four-way valve, and the piston mechanism and the valve unit are shifted by using a differential pressure between the piston rooms, and the four-way valve is switched, whereby a cooling operation and a heating operation are switched;

a pressure accumulator in which a coolant which is related to the discharge pressure of the compressor is accumulated when the compressor is operated; and the differential pressure which is required for switching the four-way valve between the piston rooms is maintained in the pressure accumulator;

the differential pressure which is required for switching the four-way valve is generated between the piston rooms of the four-way valve when the compressor is stopped and is not being operated;

the pressure accumulator is a high pressure accumulator of a coolant which is discharged from the compressor;

the high pressure accumulator is connected to a pipe which passes the high pressure coolant which is discharged from the compressor via a check valve in which a flow direction is a direction for flowing the coolant which is discharged from the compressor; and the high pressure accumulator is connected to the one side or the another side piston room via a control solenoid valve; whereby the high pressure coolant which is discharged from the compressor is supplied to the one side or the another side piston room.

4. A vehicular air conditioner as recited in claim 3, wherein a capacity of the pressure accumulator is 1.5 times to 3 times with respect to a maximum capacity of the one side or the another side piston room.

* * * * *